Patented Jan. 19, 1943

2,308,736

UNITED STATES PATENT OFFICE 2,308,736

LUMINESCENT MATERIAL

Gunther Aschermann, Berlin-Zehlendorf, and Hedwig Strubing, Berlin-Britz, Germany, assignors to General Electric Company, a corporation of New York No Drawing. Application June 11, 1941, Serial No. 397,604. In Germany August 7, 1940

8 Claims. (Cl. 250—81)

The present invention relates to luminescent materials generally, and more particularly the invention relates to luminescent silicates similar to those disclosed in the copending application Serial No. 356,115, filed September 9, 1940, which is assigned to the assignee of the present application.

The luminescent materials disclosed in the copending application are silicates of aluminum, beryllium or magnesium, or mixtures thereof, activated with cerium sesquioxide. Such silicates emit blue and ultraviolet light when irradiated by low pressure or high pressure mercury vapor lamps.

The object of the present invention is to provide luminescent silicates of the above type which emit very strong red light under radiation from luminous mercury vapor discharges. Another object of the invention is to provide a method of manufacturing such luminescent silicates. Still further objects and advantages of the invention will be apparent from the following detailed description thereof and from the appended claims.

We have discovered and demonstrated that luminescent silicates of aluminum, beryllium and magnesium emitting strong red light under mercury vapor radiation are produced when these silicates contain manganese oxide as an activator in addition to cerium sesquioxide. In view of the fact that an addition of manganese to a cerium sesquioxide free silicate of aluminum, beryllium or magnesium does not produce a material capable of emitting light under excitation by mercury vapor radiation, the results attained by us are unexpected. The luminescent materials of the present invention are useful in conjunction with mercury vapor discharge lamps either alone or with other luminescent materials emitting green, blue or yellow light for the production of daylight or any other mixed light.

Preferably, the total weight of the two activators, manganese oxide and cerium sesquioxide, does not exceed 15% of the weight of the luminescent silicate and the content of cerium sesquioxide is larger than the content of manganese oxide. The cerium and manganese are preferably in a ratio of 10 to 1 up to 2 to 1, and particularly good results are obtained when these ingredients are in a ratio of 5 to 1. Aluminum silicates containing 5% by weight of cerium sesquioxide and 1% by weight of manganese oxide emit a bright red light. A content of more than 2% by weight of manganese gives a gray color to the otherwise pure white powder, but does not change the color of the light emitted thereby. The red light emitted by the material deepens in color as the content of cerium and manganese is increased.

The method of manufacturing the luminescent materials of the present invention is very simple. Pure aluminum oxide, beryllium oxide or magnesium oxide, or, when desired, a mixture of two or all of these materials is mixed with pure silicic acid in the ratio of 3 to 1 to produce a metasilicate, or in a ratio of 3 to 2 to produce an orthosilicate. It is not essential, however, that these stoichiometric ratios be accurately maintained. Cerium and manganese are added as oxides, such as cerium dioxide ($CeO_2$) and manganese dioxide ($MnO_2$), or as salts, such as cerous nitrate $Ce(NO_3)_3$ and manganese chloride ($MnCl_2$). The batch containing the above ingredients is then thoroughly mixed. This is done preferably by grinding the batch in a wet state for several hours in a porcelain ball mill. The mixture is dried and heated for approximately one-half hour in a reducing atmosphere to a temperature of approximately 1200 to 1300 degrees C. A reducing atmosphere of pure hydrogen is very effective. After completion of the heating step, the material is pulverized and sifted and is then ready for use.

When desired, melting substances such as chlorides or carbonates of the alkalies, are added to the mixture for facilitating manufacture, and in quantities up to about 10% by weight. When such materials are used, the light output of the material is increased.

The luminescent materials of the present invention are useful in conjunction with low pressure mercury vapor discharge devices of the positive column type, such as tubular fluorescent lamps and sign tubes now in extensive commercial use. These devices contain a starting gas, such as argon, at a pressure of approximately 1 to 10 mm. and a quantity of mercury, the vapor of which is luminous during the operation of the device. Preferably, the particles of luminescent material are applied to the inner surface of the enevlope in such devices, though such particles may be applied to the outer surface of the envelope or on a supporting surface separated from the device when the envelope consists of material pervious to the exciting radiation emitted by the luminous mercury vapor. The luminescent material is also useful in conjunction with high pressure mercury vapor discharge devices of the positive column type having an envelope of material pervious to the exciting radiation of the mercury vapor discharge. Due to the elevated temperature of the envelope during operation of such high pressure devices, the luminescent material is supported in spaced relation to said envelope, for example, on the inner surface of a light transmitting jacket or sleeve about the envelope of the device.

What we claim as new and desire to secure by Letters Patent of the United States is:

1. A luminescent silicate of at least one metal selected from the group consisting of aluminum, beryllium and magnesium containing cerium sesquioxides and manganese oxide as activators.

2. A luminescent silicate of at least one metal selected from the group consisting of aluminum, beryllium and magnesium containing up to about 15% by weight of cerium sesquioxide and manganese oxide as activators.

3. A luminescent silicate of at least one metal selected from the group consisting of aluminum, beryllium and magnesium containing up to about 15% by weight of cerium sesquioxide and manganese oxide as activators, the cerium sesquioxide content being in major proportion and the manganese oxide content being in minor proportion of the total content of activators.

4. A luminescent silicate of at least one metal selected from the group consisting of aluminum, beryllium and magnesium containing up to about 15% by weight of cerium sesquioxide and manganese oxide as activators, the ratio of cerium sesquioxide to manganese oxide being between about 10 to 1 and 2 to 1.

5. A luminescent silicate of at least one metal selected from the group consisting of aluminum, beryllium and magnesium containing about 5% by weight of cerium sesquioxide and 1% by weight of manganese oxide.

6. A luminescent aluminum silicate containing 5% by weight of cerium sesquioxide and 1% by weight of manganese oxide.

7. The method of manufacturing a luminescent silicate which comprises the steps of mixing pure silicic acid, a pure oxide of a material from the group consisting of aluminum, beryllium and magnesium, a compound of cerium and a compound of manganese, and heating said mixture in a reducing atmosphere to a temperature of approximately 1100 to 1300° C.

8. The method of manufacturing a luminescent silicate which comprises the steps of mixing pure silicic acid, a pure oxide of a material from the group consisting of aluminum, beryllium and magnesium, an alkali compound, a compound of cerium and a compound of manganese, and heating said mixture in a reducing atmosphere to a temperature of approximately 1100 to 1300° C.

GUNTHER ASCHERMANN.
HEDWIG STRUBING.